No. 784,141. Patented March 7, 1905.

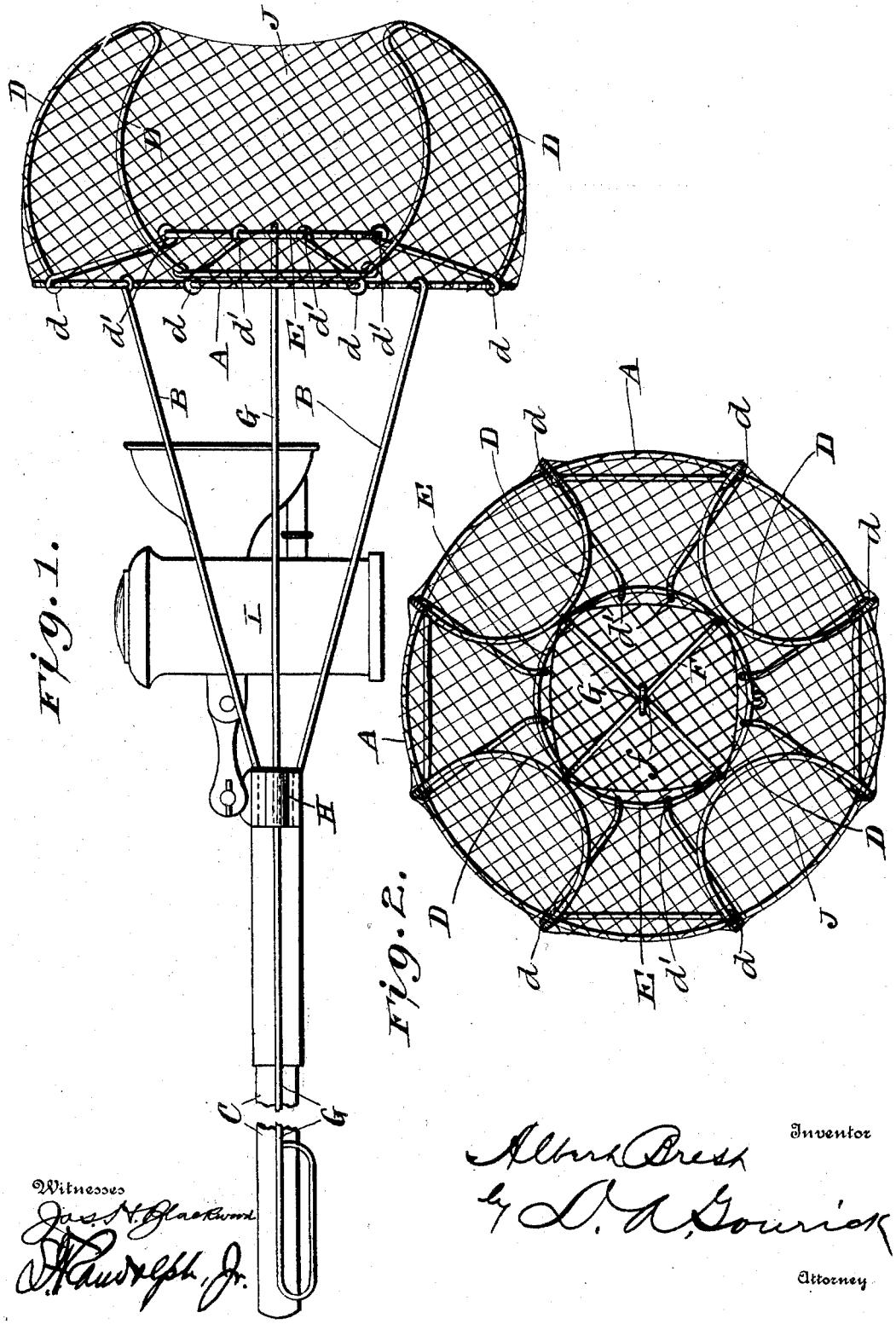

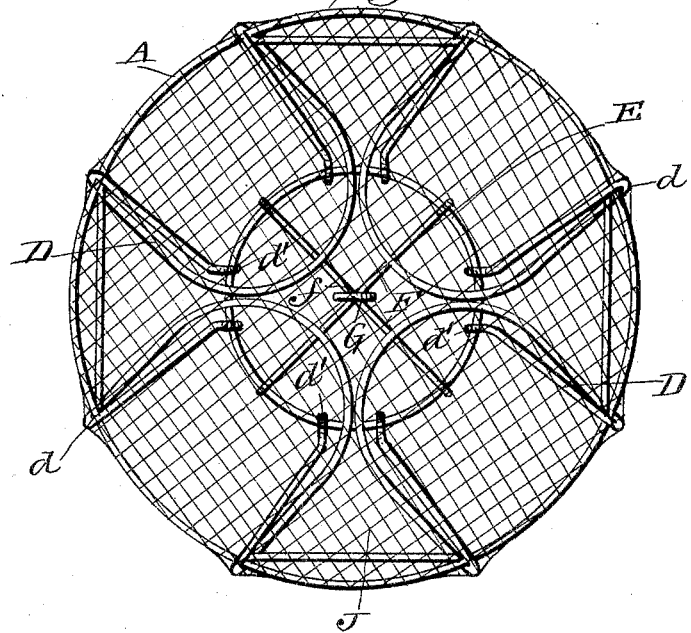
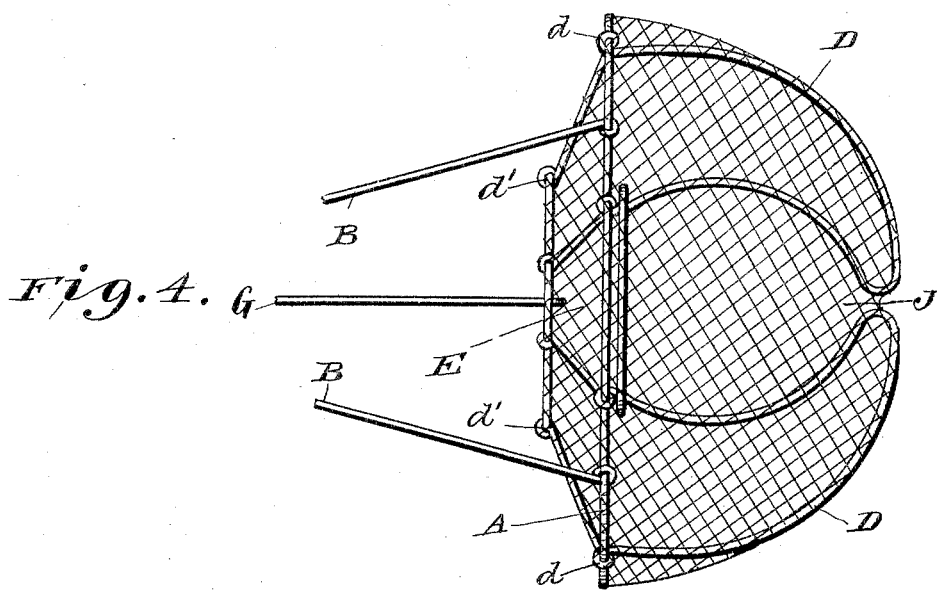

UNITED STATES PATENT OFFICE.

ALBERT BREST, OF NEWCASTLE, PENNSYLVANIA

ANIMAL-TRAP.

SPECIFICATION forming part of Letters Patent No. 784,141, dated March 7, 1905.

Application filed August 12, 1904. Serial No. 220,550.

*To all whom it may concern:*

Be it known that I, ALBERT BREST, a citizen of the United States, residing at Newcastle, in the county of Lawrence and State of Pennsylvania, have invented certain new and useful Improvements in Animal-Traps, of which the following is a specification.

My invention relates to traps for animals, and is especially designed for catching frogs, and has for its object the provision of a cage-like trap secured to the end of a pole to be held by the sportsman and having a lure consisting of a bull's-eye lantern secured to said pole and so positioned that its light shines through the mouth of the trap, the trap being opened and closed by the sportsman at will.

The construction and operation of my invention will be described hereinafter and understood by an inspection of the drawings, in which—

Figure 1 is a side view of my invention, showing the trap open; Fig. 2, a front view of the trap in an open position; Fig. 3, a front view of the trap in a closed position, and Fig. 4 a side view of the trap in a closed position.

In the drawings similar reference characters indicate corresponding parts throughout the several views.

A represents a ring secured by rods B to a handle or pole C. D represents jaws made of heavy wire or other suitable material bent to form a cage-like structure when in a closed position and mounted on said ring by means of loops $d$, formed by bending the wire, the ends of the wires forming said jaws being bent into loops $d'$ around a ring E. F represents rods secured to said ring E and crossing one another in the center of the ring at $f$, and G an operating-rod secured to the crossing of $f$ and running through guides H to the end of the pole or handle C.

I represents a lantern secured to rods B and so positioned that the light therefrom shines through the trap, and when the jaws D are in an open position through the opening therein.

The ends of the wires forming the jaws D, between the loops $d$ and $d'$, are bent in such a relation to the part of the jaws outside of said loops $d$ that when the jaws are in a closed position they extend outside of the plane of the ring A, while when the jaws are open the parts between loops $d$ and $d'$ and ring E are on a plane inside of ring A. This construction of the jaws and ring E causes a resiliency of said jaws that serves to hold them in either an open or closed position and also to cause a quick action of the jaws in opening and closing.

J represents a net secured to the frame and jaws.

In operation the trap with the jaws open is held in close proximity to the frog, which is attracted by the light and jumps through the open jaws toward the light. The jaws are then closed and the victim removed at pleasure.

Having thus described my invention, what I claim is—

1. In a trap, a handle, a cage-like receptacle mounted on said handle and a lure secured to said handle, substantially as shown and described.

2. In a trap, a handle, a cage-like receptacle mounted on said handle, and a lantern secured to said handle and so positioned that the shaft of light therefrom shines through said receptacle, substantially as shown and described.

3. In a trap, a handle, a ring secured to said handle, jaws pivotally mounted on said ring, means to operate said jaws, and a lantern secured to said handle and mounted so that the shaft of light therefrom shines through the opening between said jaws, substantially as shown and described.

4. In a trap, a ring suitably mounted, jaws made of heavy wire bent to form loops around said ring, the free ends of said wires formed with loops, a ring passed through said loops, and a rod secured to the last-named ring to operate said jaws, substantially as shown and described.

5. In a trap, a handle, rods secured to said handle, a ring secured to said rods, jaws made of heavy wire bent to form loops around said ring, the free ends of said wires formed with loops, a ring passed through said loops, a rod secured to the last-named ring to operate said jaws, and a lantern secured to the handle and so positioned that the shaft of light therefrom shines through the opening between said jaws when open, substantially as shown and described.

6. In a trap, a ring suitably mounted, jaws made of heavy wire bent to form loops around said ring, the free ends of said wires formed with loops, a ring passed through said loops, a net secured to said jaws and covering it, and means to open and close said jaws, substantially as shown and described.

7. In a trap, a handle, a ring mounted on said handle, jaws pivoted on said ring and so shaped that when closed they form an inclosed cage, a net covering said jaws, means to open and close said jaws, and a lantern secured to said handle and so positioned that its light shines between the jaws when open, substantially as shown and described.

8. In a trap, a handle, a ring mounted on said handle, jaws pivoted on said ring and so shaped that when closed they form an inclosed cage, a net secured to and covering said jaws, a rod secured to the jaws to open and close them, and a lantern secured to said handle and so positioned that the shaft of light therefrom shines between said jaws when open, substantially as shown and described.

In testimony whereof I hereto affix my signature in the presence of two witnesses.

ALBERT BREST.

Witnesses:
GEORGE T. WEINGARTNER,
ROBERT K. AIKEN.